June 26, 1951 A. A. BUEN 2,558,036
TEMPLET GUIDED CUTTER FOR SHAPING LOG ENDS
Filed Dec. 17, 1947 2 Sheets-Sheet 1

INVENTOR.
Anders Asmundson Buen
BY

June 26, 1951 A. A. BUEN 2,558,036
TEMPLET GUIDED CUTTER FOR SHAPING LOG ENDS
Filed Dec. 17, 1947 2 Sheets-Sheet 2

INVENTOR.
Anders Rasmundsen Buen
BY

Patented June 26, 1951

2,558,036

UNITED STATES PATENT OFFICE 2,558,036

TEMPLET-GUIDED CUTTER FOR SHAPING LOG ENDS

Anders Asmundsen Buen, Ovre Jondalen, near Kongsberg, Norway

Application December 17, 1947, Serial No. 792,260
In Norway June 30, 1942

Section 1, Public Law 690, August 8, 1946
Patent expires June 30, 1962

6 Claims. (Cl. 144—144)

The present invention relates to a method of machinally preparing the corner portions of logs for log-houses.

It is previously known to provide deals with corner joints mechanically by milling out semi-circular corner joint members having a cam portion or cam portions.

According to the present invention there is prepared a templet or mould member having guide surfaces for tools adapted to shape the logs, and such templet is placed in position on each log for forming or shaping of the log ends, by this expedient the log end in question will get the desired shape and position irrespectively of the cross sectional shape of the log so treated or the varying, natural taper thereof.

Other features of the invention will be explained in the following description, reference being made to the drawings, in which—

Figure 1:
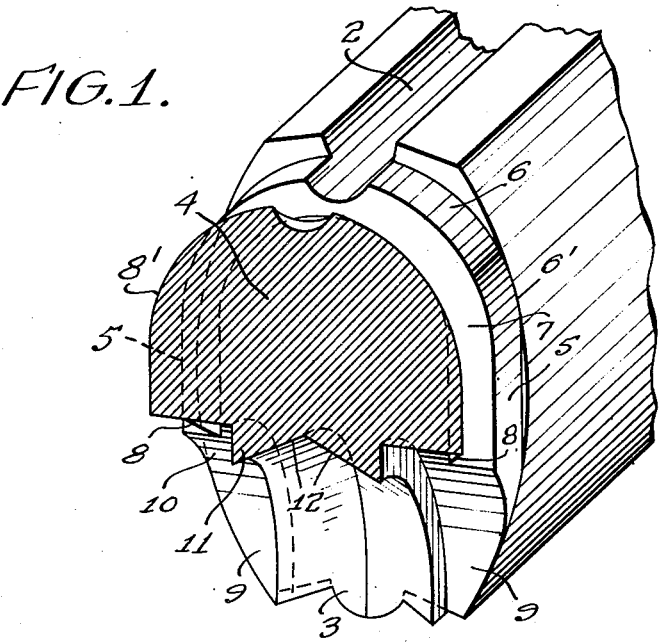
Figure 1 is a perspective, sectional view of a shaped log end.

A timber log 1 is shown provided with a groove 2 and a feather 3, but as will be understood the shapes thereof are not critical, and they may have any preferred form. The general cross sectional shape of the log may be oval, as shown, but also this is not critical.

At a distance from its end each log is provided with a neck-portion 4 with parallel side surfaces 5 and the width thereof is somewhat less than the width of the log 1 proper. The top portion of the portion 4 is circumscribed by a semi-circular surface 6, the radius of which equals half the width of the neck-portion 4. The length of the portion 4 equals the thickness thereof. The portion 4 is provided with a circumferential groove 7, the bottom of which is formed by two faces 8 enclosing an acute angle therebetween, the apex 8' of said groove being in plane with the surfaces 6 and 5 respectively. The bottom of this groove 7 thus forms a feather or rib, the apex of which lies in plane with the circumferential surface of portion 4.

The radius of the surface 6, and accordingly also the width of the neck-portion 4, is so chosen relatively to the width of the log proper, that said surface will form a tangent to the circumferential surface 6 of the log at a point 6' situated approximately midways of the arcs bounding the upper half of the log's cross section. Thus the top side of the portion 4 will be situated near up to the grooved side of the log.

At the under side of the portion 4 is formed a notch having parallel side surfaces 9 of relative distance equalling the distance between the side surfaces 5 of the portion 4. Said notch is upwards bounded by a semi-circular surface 10 making tangent to the horizontal middle plane of the log. At its center portion said notch is provided with a feather 11, the central part of which has a cutout bounded by oblique surfaces 12 corresponding to the oblique surfaces 8 at the top side of the portion 4, so that the cross section of the rib 11 will correspond to that of the groove 7.

Said notch is so situated, that the vertical central plane thereof coincides with the vertical central plane through the longitudinal middle plane of the neck portion 4.

Figure 2:
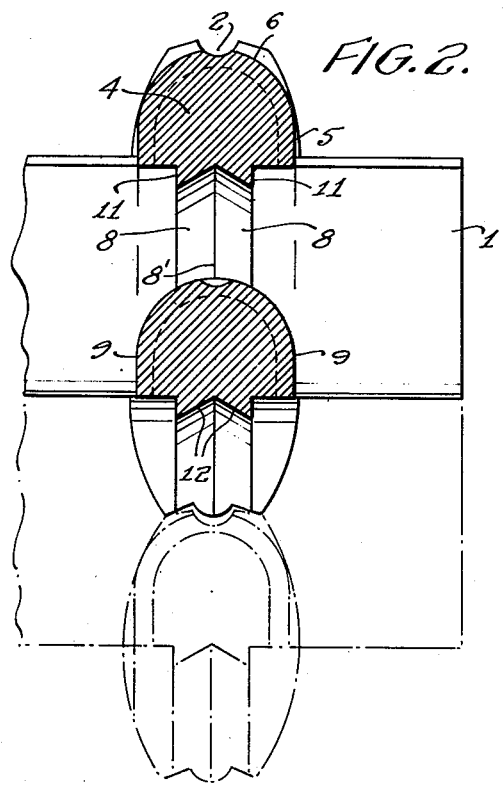
Figure 2 illustrates several cooperating logs, partly in section.

When a log is placed upon another log the notch in the under side of such log will grip the other logs portion 4, the rib 11 entering the groove 7 as will be seen by inspecting the drawing, and especially Figure 2 thereof.

Figure 4:
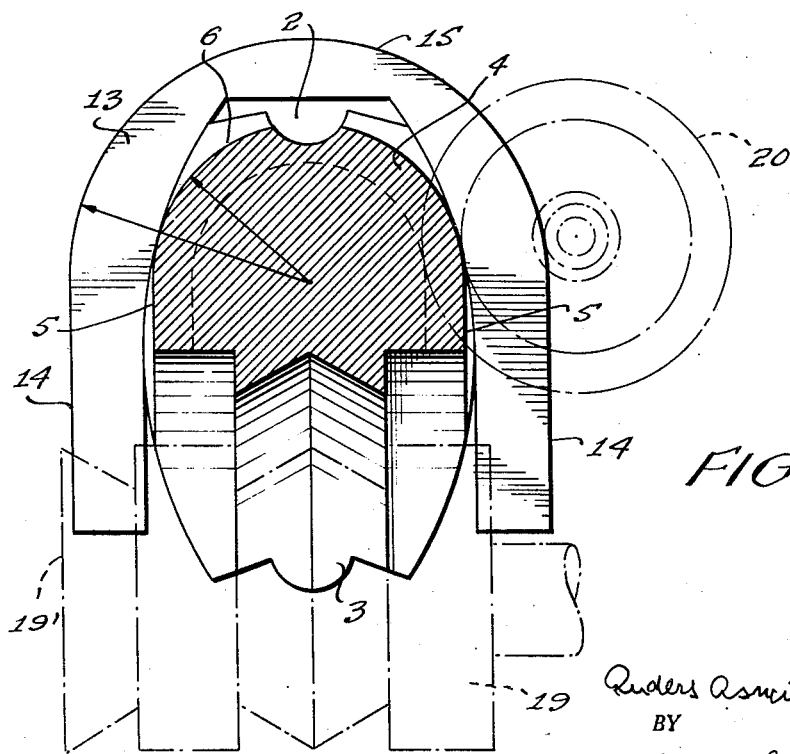
Figure 4 is a cross section, on a larger scale, of a log showing a templet or jig in operative relation thereto.

For forming or shaping the neck portion 4 correctly and in correct position relatively to the log proper the invention provides a special jig or templet for this purpose. Said templet consists of two rigidly interconnected hoop parts or legs 13 (Figures 4 and 5) having such relative distance therebetween that the templet may be placed on and around the log to engage the same as shown on Figure 4. The outer sides of the hoop is formed by two parallel side surfaces 14 connected by a semi-circle 15, the centre of which coincides with the centre of the semi-circular surface 6 of the neck portion 4.

The hoops or forks 13 are at suitable distances rigidly and preferably detachably interconnected by means of a hoop-like guide member 16, vertically displaceable in suitable guides 17 above a table 18, on which the log 1 rests when milled.

When a log has been placed in position on the table 18, the jig or templet 13 is placed thereover as shown. Under the table is provided a vertically displaceable milling cutter 19, having diameter and contour corresponding to the notch to be formed at the under side of the log. This milling cutter now is shifted upwards, thereby milling out the notch that, as previously stated, shall extend to the middle height of the log cross section. Instead of using a milling cutter 19 of a diameter corresponding to the width of the notch to be formed it is also possible to use a smaller milling cutter guided by suitable guides so that the notch gets the desired shape.

Figure 5:
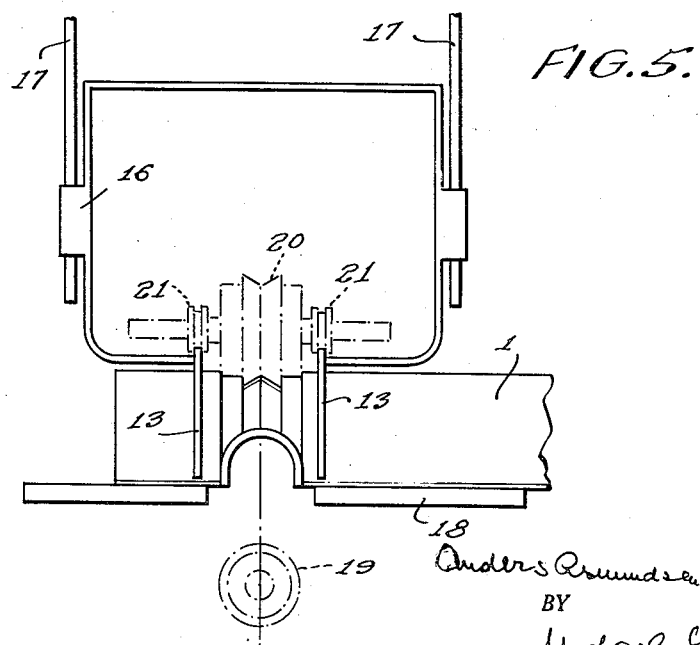
Figure 5 is a diagrammatical side view of the jig or templet together with some details of the milling machine.

The notch being made, the portion 4 is shaped by means of a suitable milling cutter 20, the shaft of which carries guide rollers 21 adapted to be guided along the surface of the templet 13, as shown on Figure 5.

By such operation the portion 4 always gets the same shape and also position relatively to the outer side of the log, independent of the outside shape of said log. The height of the log portion 4 will vary according to the height of the log proper, but the position of the top semicircular surface will always be the same, and thus an addition in height will appear as an extension downwards of the lower, parallel-sided part of the portion 4, as shown in dotted lines at the lowermost part of Figure 2.

Thus it is of no importance, as to the shaping of the log end, that the heights of the log may be different at the opposite ends thereof, and the longitudinal axis of the neck portion 4 will always become parallel to the longitudinal axis of the log proper, since the templet is guided in fixed guides, so that the legs or forks 13 are moved simultaneously and rectilinearly downwards against the log resting upon the table 18, and the downward movement thereof is stopped even if only one of said legs 13 abuts against the log.

Figure 3:
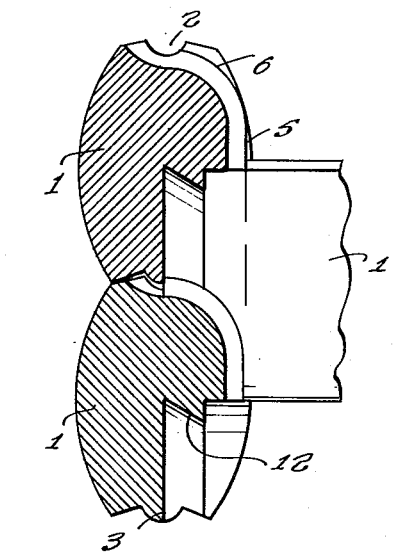
Figure 3 is a view similar to Figure 2 of a modified embodiment.

The arrangement described above also may be modified for production of "half-joints." For this purpose the milling cutter 19 is provided with an end milling portion 19' (Figure 4) so that if the milling cutter is displaced relatively to the log until the end of said portion 19' coincides with the vertical central plane of the log, the desired cutout may be formed, as shown in Figure 3. The top side of the portion 4 is formed by means of the templet and the milling cutter 20, as described above. The end of the cooperating log corresponds to the portion 4 as divided along the longitudinal central plan cross sectional plane thereof, and is accordingly shaped by means of the templet and the milling cutter 20, as described above.

As previously mentioned it is known, in connection with planks, to mill out a joint end having a semi-circular top portion, but since planks have rectangular cross sections those problems do not arise in connection therewith, that are solved by the present invention.

Moreover it is not necessary that the top of the neck portion 4 is bounded by a semi-circle, since it may have any other arcuate shape and parallel side surfaces, the faces of the templet are then formed with corresponding guide faces for the milling cutter, and corresponding guides are arranged for the cutter 19.

As will be understood the templet may be adopted for any cross section of the log, and since the templet is removably connected with the hoop 16 or the guides 17 respectively any desired templet may be chosen and inserted into the milling machine.

I claim:

1. A templet apparatus for milling logs comprising, in combination, a U-shaped templet member having an inner surface of a generally U-shape, whereby said inner surface may be located transversely about and in contact with logs having varying cross sectional shapes, and an outer surface having the shape of a groove to be cut in the logs, whereby said outer surface may guide a tool for cutting a groove in the surfaces of logs at a part thereof laterally spaced from the templet member; and guide means engaging said templet member for linearly guiding the same toward and away from the log to be cut and transversely of the longitudinal axis of said log.

2. A cutting apparatus for milling logs comprising, in combination, a U-shaped templet member having an inner surface of a generally U-shape, whereby said inner surface may be located transversely about and at least partially in contact with logs having varying cross sectional shapes, and an outer surface having the shape of a groove to be cut in the logs; guide means engaging said templet member for linearly guiding the same toward and away from the log to be cut and transversely to the longitudinal axis thereof; a cutting tool having a cutting portion laterally spaced from said templet member and located so as to cut into the outer surface of the log; and means movably mounting said cutting tool on said outer surface of said templet so that said cutting tool is guided thereby.

3. A templet apparatus for milling logs comprising, in combination, a pair of spaced U-shaped templet member having inner surfaces which are of a generally U-shape, whereby said inner surfaces may be located transversely about and at least partially in contact with logs having varying cross sectional shapes, and having outer surfaces provided with the shape of a groove to be cut in the logs, whereby a cutting tool may be supported in the space between said templet members and on the outer surfaces thereof to be guided by said outer surfaces for cutting a groove in the surface of the log at a part thereof located between said spaced templets; and guide means engaging said templet members for linearly guiding the same toward and away from the log to be cut and transversely to the longitudinal axis thereof.

4. A templet apparatus for milling logs comprising, in combination, a pair of spaced U-shaped templet members having inner surfaces which are of a generally U-shape, whereby said inner surfaces may be located transversely about and at least partially in contact with logs having varying cross sectional shapes, and having outer surfaces provided with the shape of a groove to be cut in the logs; a cutting tool supported on the outer surfaces of said templet members and located between the same so as to be guided by said outer surfaces for cutting a groove in the surface of the log at a part thereof located between said spaced templets; and frame means for rigidly connecting said pair of templet members in a position parallel to each other and transversely of the longitudinal axis of the log to be cut.

5. A templet apparatus for milling logs comprising, in combination, a pair of spaced U-shaped templet members having inner surfaces which are of a generally U-shape, whereby said inner surfaces may be located transversely about and at least partially in contact with logs having varying cross sectional shapes, and having outer surfaces provided with the shape of a groove to be cut in the logs; a cutting tool having a cutting portion located between said templet members so as to cut into the surfaces of the logs at a part thereof which is between said templet members; means on said cutting tool engaging said outer surfaces of said templet members so that said cutting tool may be guided thereby to cut a groove having the shape of said outer surfaces; and guide means engaging said templet members for linearly guiding the same toward and away from the log to be cut and transversely to the longitudinal axis thereof.

6. A templet apparatus for milling logs comprising, in combination, a pair of spaced U-shaped templet members having inner surfaces which are of a generally U-shape, whereby said inner surfaces may be located transversely about and at least partially in contact with logs having varying cross sectional shapes, and having outer surfaces provided with the shape of a groove to be cut in the logs; a cutting tool having a cutting portion located between said templet members so as to cut into the surfaces of the logs at a part thereof which is between said templet members; means on said cutting tool engaging said outer surfaces of said templet members so that said cutting tool may be guided thereby to cut a groove having the shape of said outer surfaces; frame means comprising a pair of elongated templet support members each having one end portion thereof fixedly connected to a side of one of the templet members which is distant from the other templet member, and each having another end portion located distant from said one end thereof; a pair of guide members located respectively adjacent to said other end portions of said templet support members, said guide members being parallel to each other and located in a plane which includes the axis of the log to be cut; and means for slidably mounting said other end portions of said templet support members on said guide members.

ANDERS ASMUNDSEN BUEN.

REFERENCES CITED

The following references are of record in the file of this patent:

UNITED STATES PATENTS

| Number | Name | Date |
|---|---|---|
| 374,493 | Parry | Dec. 6, 1887 |
| 1,042,120 | Kelley | Oct. 22, 1912 |
| 1,277,689 | Boda | Sept. 3, 1918 |
| 1,445,738 | Adams | Feb. 20, 1923 |
| 1,615,213 | Carter | Jan. 25, 1927 |
| 1,846,199 | Hall | Feb. 23, 1932 |
| 2,005,921 | Reither | June 25, 1935 |
| 2,366,831 | Cartledge | Jan. 9, 1945 |

FOREIGN PATENTS

| Number | Country | Date |
|---|---|---|
| 67,915 | Norway | June 5, 1944 |